(12) United States Patent
St. Germain et al.

(10) Patent No.: US 8,328,996 B2
(45) Date of Patent: Dec. 11, 2012

(54) METHOD AND APPARATUS FOR DESALINATING WATER COMBINED WITH POWER GENERATION

(76) Inventors: Girard Charles St. Germain, Dallas, GA (US); Richard N. Barnett, Mosheim, TN (US)

(*) Notice: Subject to any disclaimer, the term of this patent is extended or adjusted under 35 U.S.C. 154(b) by 0 days.

(21) Appl. No.: 13/035,980

(22) Filed: Feb. 27, 2011

(65) Prior Publication Data

US 2011/0271505 A1 Nov. 10, 2011

Related U.S. Application Data

(62) Division of application No. 11/581,285, filed on Oct. 16, 2006, now Pat. No. 7,922,873.

(51) Int. Cl.
 B01D 1/00 (2006.01)
 B01D 3/00 (2006.01)
 C02F 1/04 (2006.01)
 E21B 43/40 (2006.01)

(52) U.S. Cl. ........... 203/10; 60/648; 159/47.1; 175/57; 203/71; 203/DIG. 17; 203/DIG. 20; 210/737; 210/747.7; 210/774; 166/244.1

(58) Field of Classification Search ............... 60/641.2, 60/648; 159/2.1, 2.3, 47.1, DIG. 8; 175/57; 203/10, 71, 88, DIG. 17, DIG. 20; 210/737; 210/747.7, 774; 166/244.1
See application file for complete search history.

(56) References Cited

U.S. PATENT DOCUMENTS

| | | | |
|---|---|---|---|
| 3,402,753 A | 9/1968 | Thomas | |
| 3,423,293 A | 1/1969 | Holden | |
| 3,438,202 A | 4/1969 | Roe | |
| 3,446,712 A | 5/1969 | Othmer | |
| 3,451,220 A | 6/1969 | Buscemi | |
| 3,467,587 A | 9/1969 | Connell et al. | |
| 3,489,652 A | 1/1970 | Williamson | |
| 3,607,668 A | 9/1971 | Williamson | |
| 3,632,505 A | 1/1972 | Nelson | |
| 3,640,850 A | 2/1972 | Smith, Jr. | |
| 3,844,899 A | 10/1974 | Sager, Jr. | |
| 3,893,299 A | 7/1975 | Hutchinson et al. | |
| 4,043,130 A | 8/1977 | Brown et al. | |
| 4,052,857 A * | 10/1977 | Altschuler | 60/641.2 |
| 4,078,976 A | 3/1978 | Spears, Jr. | |
| 4,091,623 A | 5/1978 | Edmondson et al. | |
| 4,094,747 A * | 6/1978 | Pfenninger | 202/173 |
| 4,186,058 A | 1/1980 | Katz et al. | |
| 4,211,613 A | 7/1980 | Meckler | |
| 4,363,703 A | 12/1982 | ElDifrawi et al. | |
| 4,617,800 A | 10/1986 | Assaf | |
| 4,882,009 A | 11/1989 | Santoleri et al. | |
| 5,346,592 A * | 9/1994 | Madani | 202/176 |
| 5,622,605 A | 4/1997 | Simpson et al. | |
| 5,925,223 A | 7/1999 | Simpson et al. | |
| 6,035,949 A * | 3/2000 | Altschuler et al. | 175/19 |
| 6,919,000 B2 | 7/2005 | Klausner et al. | |
| 6,932,168 B2 | 8/2005 | Morgan et al. | |
| 7,037,430 B2 | 5/2006 | Donaldson et al. | |
| 7,510,658 B2 * | 3/2009 | Gordon | 210/652 |
| 7,669,670 B2 * | 3/2010 | Pinto Bascompte | 175/61 |
| 7,712,326 B2 * | 5/2010 | Jagusztyn et al. | 62/260 |

* cited by examiner

Primary Examiner — Virginia Manoharan

(57) ABSTRACT

A method and apparatus for desalinating water combined with power generation, wherein a desalination system is used for desalinating coastal seawater and is operationally related to a power generation system, wherein such dual purpose co-generation facility captures the heat vapor exhausted or a steam turbine generator's condenser is replaced by the desalination plant's heat exchanger enabling such captured heat energy to reduce the energy requirements of the desalination plant, and wherein brine solution being utilized by the desalination plant is circulated from and to the substrata sea water table via supply and return wells.

7 Claims, 3 Drawing Sheets

METHOD AND APPARATUS FOR DESALINATING WATER COMBINED WITH POWER GENERATION

PRIORITY CLAIM TO RELATED US APPLICATION

To the full extent permitted by law, the present U.S. Non-Provisional patent application, on behalf of inventors Girard Charles St. Germain and Richard N. Barnett, is a Divisional of and claims priority to and the benefit of U.S. Non-Provisional patent application entitled "Deep Well Desalinization Process" filed on Oct. 16, 2006, having assigned Ser. No. 11/581,285, now U.S. Pat. No. 7,922,873, issued Apr. 12, 2011.

TECHNICAL FIELD

The present invention relates generally to a combined gas turbine power plant and desalinization process for desalinating seawater or brine, and more specifically for accessing substrata seawater to be utilized for the desalinization process.

BACKGROUND

As world population increases, demand for fresh water and power will also increase. Pollutants and drought result in a shortage of fresh water in many locations. Therefore, it would be desirable to provide a process utilizing desalination and distillation combined with power generation whereby demand for fresh water and power can be simultaneously satisfied in and near coastal areas.

Desalination refers to any of several commercial processes (e.g. distillation/evaporation, reverse osmosis/membrane processes, freezing, geothermal, solar humidification, methane hydrate crystallization, and high grade water recycling) that remove the salt, minerals and other solids from water in order to obtain fresh water suitable for animal consumption, irrigation, or human consumption. Dual purpose power plants have also been utilized; however, most previous processes of desalination have been stand-alone processes. Hence, the focus has been upon energy efficiency to satisfy economics. A number of factors determine the capital and operating costs for desalination: capacity and type of facility, location, feed water, labor, energy, financing and concentrate disposal. Generally the cost of removing salt from seawater will be about 3-5 times that of removing salt from brackish water.

Distillation is the process of heating a liquid until it boils, capturing and cooling the resultant hot vapors, and collecting the condensed vapors. Evaporation is the boiling of salinous water by the addition of heat followed by the condensation of the steam by heat exchange. Evaporators may be classified as boiling or flashing. Desalination stills control pressure, temperature and brine concentrations to optimize the water extraction efficiency. Distillation techniques, although dating back to antiquity, share the following difficulties: high capital cost, and the consumption of large amounts of energy.

Flash distillation is often employed in the recovery of a solvent from a solution containing a salt or other dissolved material, for example, in desalinization of seawater to produce fresh water. Flash distillation is also employed in the chemical industry and the food industry for the concentration of liquors. In such operations, the solution being treated is commonly referred to as the brine. Multistage flash distillation heats the brine to a desired temperature in its liquid state and then effects the evaporation of the heated solution in a series of stages which are maintained at progressively decreasing pressures. The condensation of the vapor created at each stage is carried out to produce the substantially pure solvent which is withdrawn. The heat which is absorbed during condensation is often employed for the preheating of the brine prior to its expansion.

It is generally known to employ parallel trains of multistage flash evaporation units, particularly in the desalination of seawater. Such installations are able to carry out desalinization in a manner which is economically competitive with other available alternative methods of desalinization.

Reverse osmosis is a technology wherein fresh water is extracted from saline water by pressure. This is accomplished by circulating saline water under high pressure (i.e., 1000-2000 psig) around a loop. One portion of the loop is adjacent to a membrane. The membrane selectively allows water to pass through it, while preventing the passage of most ions. Effectively, fresh water is squeezed from the saline water. Excellent energy efficiency can be achieved by this method. However, reverse osmosis techniques share the following difficulties: the membranes are prone to plugging and in practice the fresh water produced is not completely free of dissolved salts.

Geothermal is a technology wherein hot water or steam is collected from hydrothermal reservoirs and transferred through a heat exchanger to a closed loop desalination system, and returned to the geothermal reservoir. The hot water in the closed loop desalination system is flashed in a flash zone to form steam and the steam is used a source of heat for desalination. Geothermal techniques share the following difficulties: such systems must be located near hydrothermal reservoirs, which may not be a co-location of seawater, high capital cost, and dependence on hydrothermal reservoirs collection rates of hot water or steam which restricts the use of this technique for large-scale production.

Solar humidification is a technology that imitates a part of the natural hydrologic cycle in that the saline water is heated by the sun's solar radiation so that the production of water vapor (humidification) increases. The water vapor is then condensed on a cool surface, and the condensate collected as product water. Variations of this type of solar process still have been made in an effort to increase efficiency, but they all share the following difficulties: large solar collection area requirements, high capital cost, and dependence on optimum weather conditions for operation, which restricts the use of this technique for large-scale production.

Accordingly, various attempts to resolve the foregoing disadvantages have been proposed. Most notably, dual purpose desalination/power plants, which are currently in use, produce fresh water by using the exhaust heat from a gas turbine as a source of heat for desalination or by using excess steam from a steam generating system used in a steam expansion turbine during low electric power demands and off peak hours as a source of heat for desalination.

Power generation using steam expansion is a common process. Conventional methods for power generation include the steam cycle, cogeneration cycle, and the combined cycle.

In the steam cycle, water is heated to produce steam at high temperature and pressure. The steam is typically superheated and expanded across a turbine to produce power. The steam will frequently be heated again and expanded across a turbine a second time. The steam will then be condensed at a low temperature and the cycle is repeated. In a dual purpose desalination/power plant the power plant's condenser is replaced by the desalination plant's heat exchanger enabling such captured heat energy to reduce the energy requirements of the desalination plant. Additional energy efficiency is improved by recovery of additional waste heat from the stack exhaust.

Power generation using gas expansion is a common process. Typically, natural gas is burned and expands across a turbine; thereby, doing work. Exhaust gases are vented through an exhaust pipe.

Additional efficiencies in energy cost and capital costs are desirable for such dual purpose desalination/power plants for obtaining potable water substantially free of trace salts, minerals, and dissolved solids in order to obtain fresh water suitable for animal consumption, irrigation, or human consumption.

Therefore, it is readily apparent that there would be a recognizable benefit from a method and apparatus for desalinating water combined with power generation utilizing the efficiencies of a dual purpose co-generation facility having reduced capital cost and reduced consumption of energy, and wherein such method and apparatus desalinates coastal or seawater.

BRIEF DESCRIPTION

Briefly described in a preferred embodiment, the present invention overcomes the above-mentioned disadvantages and meets the recognized need for such an invention by providing a method and apparatus for desalinating water combined with power generation, comprising a desalination system used for desalinating coastal seawater and further comprising a power generation system, wherein such dual purpose co-generation facility captures the heat vapor exhausted by the power generation system, or a steam turbine generator's condenser is replaced by the desalination plant's heat exchanger enabling such captured heat energy to reduce the energy requirements of the desalination plant, wherein brine solution being treated by the desalination plant is pumped from the substrata sea water table wells having low salt content brackish; thus, enabling distillation combined with power generation with the economic effects inherent in such a combination system.

The deep well desalination supply process provides potable water through desalination of substrata seawater in coastal locations. Deep wells provide seawater (brine) to a desalinization facility at a surface location. A portion of the brine is flashed and converted to product water in flash evaporation desalinization units and the remaining brine is re-injected into the substrata seawater table. Brine will be pumped from the substrata sea water table through multiple supply wells, taking suction well below the fresh water aquifer and substrata barriers, to supply the flash evaporation desalinization trains. Distilled water captured in the flash evaporation desalinization trains will be transfer to the product water storage tanks for processing. Brine effluent from the desalinization trains will be re-injected into the substrata seawater layer through multiple re-injection wells, thus closing the cycle of brine flow. The concentration factor for the brine is projected to be less than 20%.

According to its major aspects and broadly stated, the present invention in its preferred form is a method and apparatus for desalinating water combined with power generation, comprising substrata sea water brine supply wells, turbine power generators, heat exchanges, desalinization trains, and brine reinjection wells.

Accordingly, a feature and advantage of the present invention is its ability to supply low salt content brackish water to the desalination plant from substrata sea water table wells.

Another feature and advantage of the present invention is its ability to re-inject brine back into substrata sea water table wells.

Still another feature and advantage of the present invention is its ability to utilize distillation combined with power generation, satisfying simultaneous demand for fresh water and power.

Yet another feature and advantage of the present invention is its ability to gain the effect of economies inherent in such a combination.

Yet another feature and advantage of the present invention is its ability to utilize common systems between both desalination and power systems resulting in a lower capital cost for such facilities when combined.

Yet another feature and advantage of the present invention is its ability to gain an economic advantage of consuming less fuel than would be needed by two separate facilities.

Yet another feature and advantage of the present invention is its ability to capture exhaust heat from a gas turbine or exhaust stack for heating saltwater to be distilled, gaining an economic advantage of consuming less fuel than would be needed to operate the desalination plant.

Yet another feature and advantage of the present invention is its ability to capture excess steam from a steam generating system; thereby, gaining an economic advantage of consuming less fuel than would be needed to operate the desalination plant alone.

Yet another feature and advantage of the present invention is its ability to provide multistage flash distillation utilizing parallel train, multistage flash distillation coupled to a source of heat.

Yet another feature and advantage of the present invention is its ability to provide a parallel train, multistage flash distillation system particularly adapted for the desalinization of seawater utilizing high temperature as a source of heat.

Yet another feature and advantage of the present invention is its ability to eliminate brine or salt waste by diluting it with fresh brine if necessary and re-injecting it back into the substrata sea water table where it further dilutes.

Yet another feature and advantage of the present invention is its ability to place the brine supply and return well heads inland, miles away from tourist areas and marine habitat, utilizing directional drilling techniques.

Yet another feature and advantage of the present invention is its ability to minimize coastal environmental impact utilizing inland well heads and not using coastal surface piping directly into the seawater.

Yet another feature and advantage of the present invention is its ability to utilize directional drilling techniques enabling placement of the brine supply and return well end taps at great distance and depths form each other so as to not inject the concentrated brine return into the supply tap area.

Yet another feature and advantage of the present invention is its ability to utilize directional drilling techniques enabling placement of return well end taps at a distance and depths form each other so as to distribute minimally concentrated brine (about 18 to 20%) evenly within the area.

Yet another feature and advantage of the present invention is its ability to access an unlimited supply of brine and converting such brine to potable water.

Yet another feature and advantage of the present invention is its ability to scale the co-generation facility to meet fresh water demands and serve a dual purpose of simultaneously supplying power demands by increasing or decreasing the number of wells, turbines and desalination trains.

These and other features and advantages of the present invention will become more apparent to one skilled in the art from the following description and claims when read in light of the accompanying drawings.

BRIEF DESCRIPTION OF THE DRAWINGS

The present version of the invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

Figure 1:
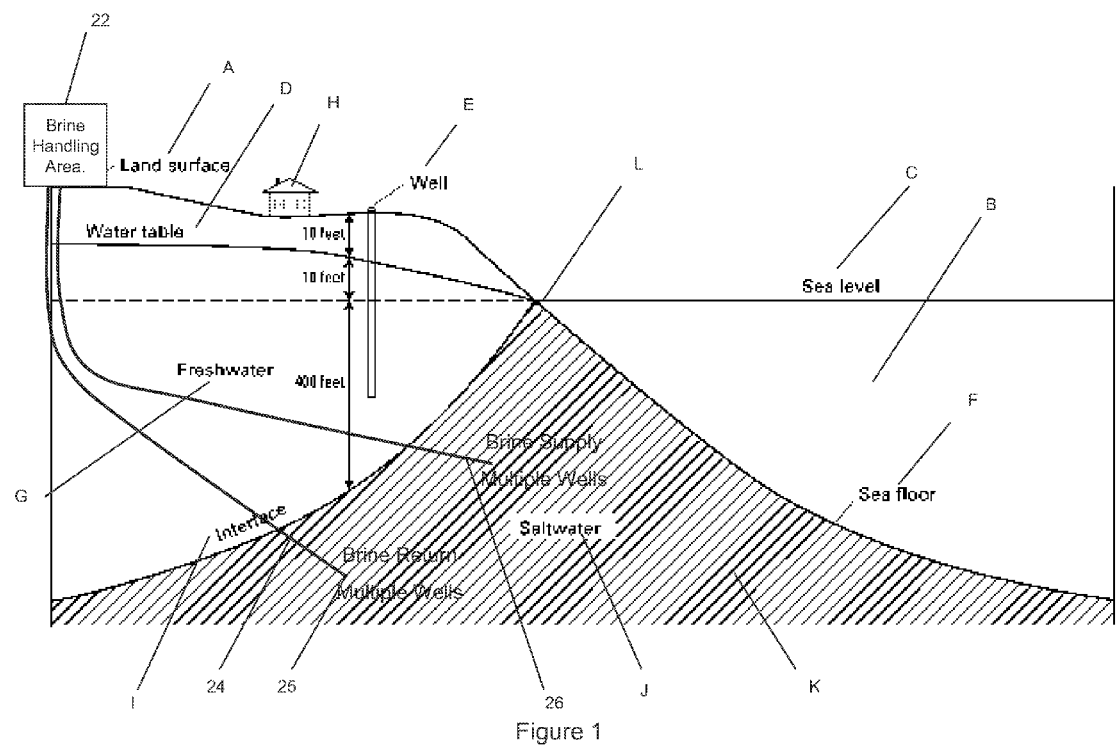
FIG. 1 is cross sectional view of geological coastal area illustrating the coastal land, seawater, sea floor and substrata water tables.
Figure 2:
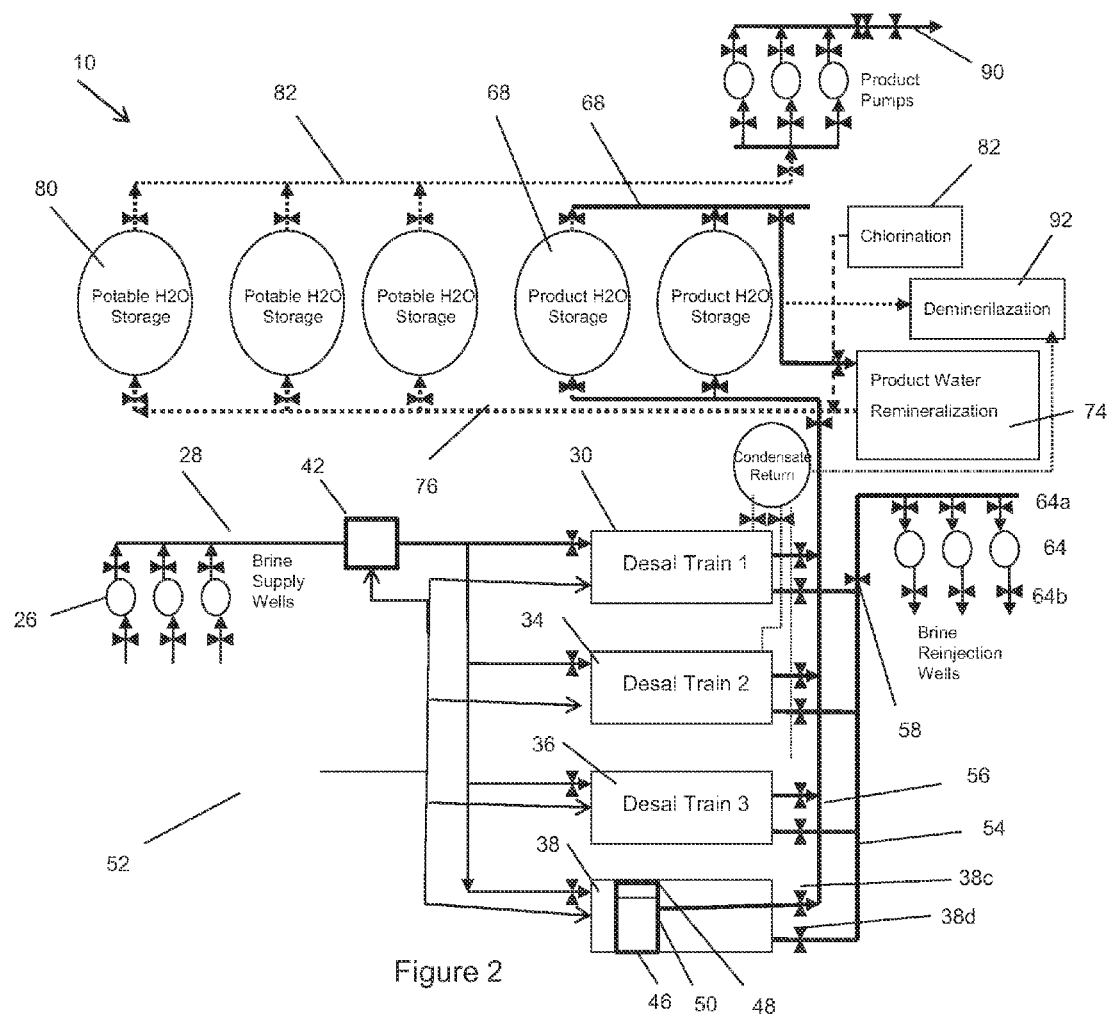
FIG. 2 is a schematic illustration of desalinization process having multi-stage desalinization trains according to a preferred embodiment of the present invention.
Figure 3:
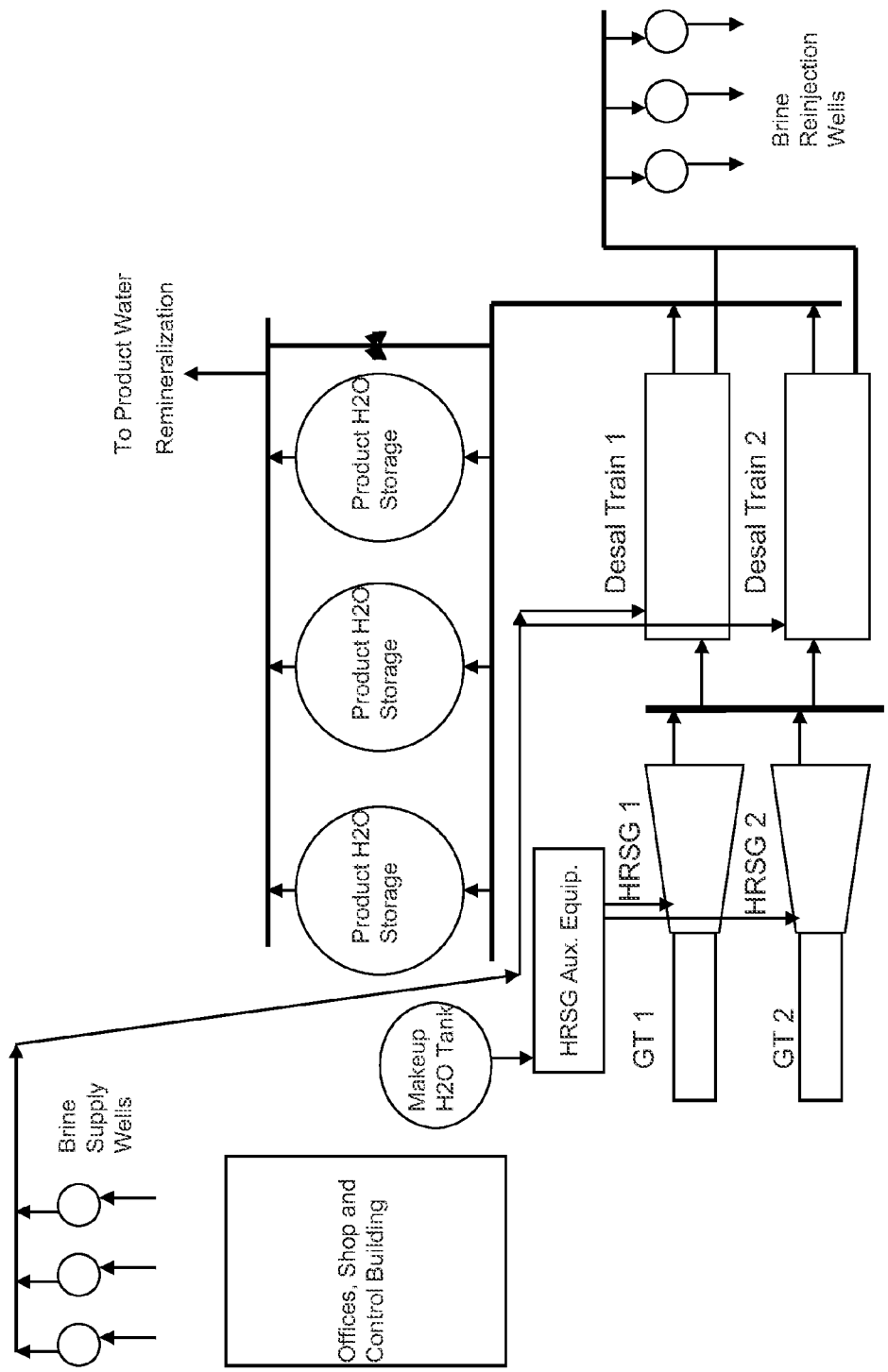
FIG. 3 is a schematic illustration of co-generation process having combined power generation and desalination processes in accordance with the present invention.

In describing the preferred and selected alternate embodiments of the present version of the invention, as illustrated in FIGS. 1-3, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIG. 1, there is illustrated a cross sectional view of geological coastal area illustrating the coastal land, seawater, sea floor and substrata water tables. The deep well desalinization supply process provides potable water through desalinization of substrata brackish (low salt content) water J in coastal locations. Brackish water J typically has 20-30% less salt content than seawater; however, site specific variations exist and test well data can verify site brackish water J salt content. Brine handling area 22 shown on land surface A preferably houses the pumping stations and well heads for brine supply well(s) 26 and brine return (discharge) well(s) 24. Brine supply well(s) 26 preferably provides brackish water J from the substrate seawater table K and pump brackish water J to a desalinization facility at a surface location via brine handling area 22. A portion of brackish water J is flashed and converted to product water in flash evaporation desalinization units and the remaining brackish water J is re-injected into the substrata seawater table K. The well drilling, pumps, piping, valves and re-insertion process utilizes a combination of existing technologies, including deep well directional drilling. In addition, pumping capabilities may exist on the surface within brine handling area 22 or submerged with brine supply well(s) 26 and/or brine return well(s) 24.

It is contemplated in a preferred embodiment that brine handling area 22 be placed inland miles away from tourist areas and marine habitat utilizing directional drilling techniques.

It is still further contemplated in a preferred embodiment that brine handling area 22 be placed inland away from coastal environmental and to utilize directional drilling to eliminate coastal surface piping directly into the seawater. In addition, such drilling enables the entire co-generation facility to be placed inland away from the shoreline so as to reduce the environmental impact to the coastal area shoreline. Preferably, brine handling area 22 is approximately ten to fifteen miles from coastal area shoreline; however, other distances are contemplated herein depending on egress of substrate seawater table K, drilling depths, salt content and the like.

It is still further contemplated in a preferred embodiment that brine supply well(s) 26 and brine return well(s) 24 having end taps 25 be drilled into substrata seawater table K at great distance and depths form each other so as to not inject the concentrated brine return into the supply tap area. Preferably, end taps 25 are 5000 to 6000 feet apart; however, other distances are contemplated herein.

It is still further contemplated in a preferred embodiment that brine return well(s) 24 taps be drilled into substrata seawater table K at a distance and depth form each other so as to distribute return brine evenly within substrata seawater table K.

It is still further contemplated in a preferred embodiment that brine return well(s) 24 eliminate brine or salt waste by product by diluting the minimally concentrated (18 to 20%) brine return and re-injecting it back into the substrata sea water.

It is still further contemplated in a preferred embodiment that drilling into the substrata seawater table K provides access to an unlimited supply of brine for conversion to potable water.

Brackish water J is pumped from the substrata sea water table K through one or more brine supply well(s) 26, taking suction well below the water table D (shown to be from land surface A to approximately 10 feet below the surface), fresh water aquifer G (shown starting at approximately 10 feet below the surface to approximately 400 feet below the surface), interface I (shown to be approximately 400 feet below the surface), and into the substrate seawater table K (shown to be an area below interface I and sea floor F).

Furthermore, FIG. 1 shows house H, well E, seawater B, sea level C, a transition point (shoreline) L where the land surface A, seal level C and sea floor F transition for illustrative purposes. Brackish water J is pumped from the substrata sea water table K through one or more brine supply well(s) 26 having input supply or check valves 26a and output supply or check valves 26b Referring now to FIG. 2, there is illustrated a schematic illustration of desalinization process 10 having multi-stage desalinization trains 30 according to a preferred embodiment of the present invention. Preferably brackish water J is pumped from the substrata sea water table K through one or more brine supply well(s) 26 passing through input valve or input check valve 26a to supply pump(s) 26 and preferably exiting pump 26 through output valve or output check valve 26b. Brackish water J preferably is pumped by supply pump 26 through supply pipe 28 interconnecting supply pump 26 and parallel desalination trains 30 via pipe taps off main supply header supply pipe 28.

Brackish water J preferably is heated to a desired temperature, which is the maximum or desired temperature at which any of the multi-stage desalinization trains 30 of the parallel trains operate, by brine heater 42 at approximately 200 degrees Fahrenheit. Heat source 52 preferably heats brackish water J in brine heater 42 to the desired temperature via a heat exchanger in brine heater 42.

Flash desalination trains 30 are illustrated in FIG. 2 as four parallel flash desalination train 1 32, flash desalination train 2 34, flash desalination train 3 36, flash desalination train 4 38. It should be understood that although four parallel trains are depicted in FIG. 2 it is anticipated that any reasonable number of trains may be utilized and any reasonable number of stages within such trains may be utilized. Each flash desalination train 32, 34, 36, 38 preferably has desalination input valve or input check valve 32a, 34a, 36a, 38a respectively, wherein brackish water J is supplied to evaporation chamber 46 via supply pipe 28. If desalination input valve or input check valve 32a, 34a, 36a, 38a is open, brackish water J preferably will be pumped by supply pump 26 into the respective flash desalination trains 32, 34, 36, 38. Preferably each flash desalination train includes one or more flash distillation stages 44, and each flash distillation stage preferably includes an evaporation chamber 46 or section into which brackish water J is supplied and caused to partially flash to vapor. Condenser section 48 preferably is located in the upper portion of each stage, and a distillate take off system 50 preferably is disposed vertically below the condenser tubing to catch the condensed water that falls there into via gravity. To provide the necessary coolant for condenser section 48 system 10 utilizes raw brackish water J, which preferably is pumped through condenser section 48 and discharged into supply line 28.

It is contemplated in a preferred embodiment that multi-stage desalinization trains 30 are manufactured by WEIR Inc., model number MSF (multistage flash units) available in various flow rates including but not limited to 1 million gallons of potable water per day to 2, 3, 4 million gallons of potable water per day, and so forth. Additional flow rates of potable water are achieved by adding additional flash desalination trains 30 and/or additional stages within such trains. Other manufactures of multi-stage desalinization trains 30 include SERK COMO, HUBART, STRAVOREN, AQUACHEM and the like.

Brine heater 42 and flash desalination trains 30 may utilize any suitable source of heat; however, the system is eminently well suited to utilize the waste heat from gas turbines, nuclear power reactors, stack and exhaust heat, and excess steam from a steam generating system used in steam power turbines, especially during outages and/or off peak power cycles. Moreover, heat source 52 may utilize resistive, combustion, or microwave sources and the like.

Preferably heat source 52 is available in the form of hot water or other single phase fluid at a temperature of between approximately 250 degrees Fahrenheit to 300 degrees Fahrenheit. Accordingly, multi-stage desalinization trains 30 preferably are shown having hot fluid inlets and input valve or input check valve 32b, 34b, 36b, 38b, respectively coupled to evaporation chamber 46.

To aid in the description, system 10 is described with respect to an exemplary system wherein brackish water J exits from brine heater 42 preferably at a temperature of about 225-290 degrees Fahrenheit and is injected into the first stage of multi-stage desalinization trains 30 preferably at a pressure of about 29 pounds per square inch (p.s.i). Each subsequent stage thereafter in multi-stage desalinization trains 30 preferably is operated at about three-quarters of the pressure than the previous adjacent stage.

The hot incoming brackish water J preferably partially flashes to water vapor at the pressure that is maintained in this stage, and brackish water J preferably is conducted to the next adjacent lower pressure stage where such partial flashing again occurs. This operation preferably is repeated in each of the stages of multi-stage desalinization trains 30 until the remainder of brackish water J reaches discharge valve or discharge check valve 32d, 34d, 36d, 38d, respectively manifolded into a common discharge pipe 54. The temperature of the brackish water J is reduced in each stage as it liberates heat from the condensing water vapor which is cooled to provide the product distillate potable water. By the time the brackish water J reaches the end stage, its temperature has reached about 100 degrees Fahrenheit. The concentrated the brackish water J in discharge pipe 54 may be coupled to a heat rejection section where discharge brackish water J gives up some of its remaining heat to incoming brackish water J being pumped through supply pipe 28. Discharge pipe 54 preferably is coupled to head discharge valve or discharge check valve 58 which preferably is coupled via discharge pipe 54. Further, discharge pipe 54 preferably is coupled to input valve or input check valve 64a to re-injection pump(s) 64 and preferably exiting pump 64 through output valve or output check valve 64b and into brine return well(s) 24. Moreover, the remaining concentrated brackish water J which remained un-flashed in multi-stage desalinization trains 30 preferably is re-injected into the substrata seawater table K via brine return well(s) 24. The remaining brackish water J is projected to be concentrated no more than 20% salt content.

It is contemplated in a preferred embodiment that brine return well(s) 24 utilize directional drilling techniques enabling placement of remaining brackish water J intake and return well taps at a distance and depths form each other so as to not inject the concentrated brine return into the supply tap area.

It is still further contemplated in a preferred embodiment that brine return well(s) 24 utilize directional drilling techniques enabling placement of return well taps at a distance and depth form each other so as to distribute return brackish water J evenly within the substrata seawater table K.

Distilled water (demineralized water) captured in multi-stage desalinization trains 30 reaches discharge valve or discharge check valve 32c, 34c, 36c, 38c, respectively and preferably is manifolded into a common discharge pipe 56. Discharge pipe 56 preferably is coupled to head discharge valve or discharge check valve 60 which preferably is coupled to input valve or input check valve 66a via discharge pipe 56. Preferably, discharge pipe 56 transfers the distilled water to the product water storage tank(s) 66 for further processing.

Preferably, the distilled water known as product water is pumped from multi-stage desalinization trains 30 to product water storage tank(s) 66 and then manifolded into a common discharge pipe 68. Discharge pipe 68 preferably is coupled to head discharge valve or discharge check valve 70 which preferably is coupled to input valve or input check valve 66a via discharge pipe 72 wherein product water from product water storage tank(s) 66 is routed to re-mineralization system 74.

Preferably, re-mineralization system 74 treats the product water with minerals to meet local, state and federal potable water standards. For example, re-mineralization may add dissolved solids such as calcium, magnesium, sodium and potassium, of about 50-250 parts per million (ppm) of total dissolved solids.

The output water from re-mineralization system 74 preferably is pumped to potable water storage tank(s) 76 via discharge pipe 76. Discharge pipe 76 preferably is coupled to input valve or input check valve 80a which is coupled to potable water storage tank(s) 76. Chlorination system 82 preferably adds chlorine to potable water in discharge pipe 76 to meet local, state and federal potable water standards.

Potable water preferably is continuously circulated in potable water storage tank(s) 76 and is continuously monitored and treated to meet local, state and federal potable water standards prior to being pumped from the potable water storage tank(s) 76.

Discharge from potable water storage tank(s) 76 exits through output valve or output check valve 80b and preferably is manifolded into a common discharge pipe 82.

Further, discharge pipe 82 preferably is coupled to head discharge valve or discharge check valve 84 which via discharge pipe 82 preferably is coupled to input valve or input check valve 86a which preferably is coupled to potable water pump(s) 86. Preferably potable water pump(s) 86 through output valve or output check valve 686b pump potable water to potable water supply line 90 feeding project clients and/or public water supply system.

Referring now to FIG. 3, there is illustrated a schematic illustration of co-generation process 20 having combined power generation and desalination processes in accordance with the present invention. Dual purpose desalination/power generation plants currently in use produce fresh water by utilizing the heat vapor exhausted or a steam turbine generator's condenser is replaced by the desalination plant's heat exchanger enabling such captured heat energy to reduce the energy requirements of the desalination plant, which significantly improves the thermal efficiency of a power plant and simultaneously desalinates seawater or brine. The component parts of FIG. 3 are similar to those represented in FIG. 2 and the text hereafter shall use the same numbers where applicable.

Power generation using steam expansion or combustible gas expansion is a common process for electric power production. Referring now to FIG. 3, the present invention in its preferred embodiment is a co-generation process 20, in which power generation and desalination processes are combined. Preferably, gas turbines 102a and 102b burn natural gas or any other combustible medium that expands and such expansion drives the turbine shaft which is coupled to an electric generator. Gas turbines (GT) 102a and 102b preferably create work in the form of rotation which when coupled to a generator produces electric power. Electric power travels from the power plant to commercial and residential customers through a system called the power distribution grid.

Although FIG. 3 represents two gas turbines 102a and 102b, it is contemplated in a preferred embodiment that one or more gas turbines may be utilized depending on the power distribution grid requirements and heat source 52 requirements of desalinization process 10. It is further contemplated in a preferred embodiment that dual purpose co-generation process 20 is optimized to simultaneously satisfy demand for fresh water and power.

Preferably, gas turbines 102a and 102b are manufactured by GENERAL ELECTRIC Inc., model number Frame 6B, available in various megawatt capacities. Additional megawatt capacities of electricity are achieved by adding additional gas turbines 102. Other manufactures of gas turbines 102 include WESTINGHOUSE, SIEMENS, ABB and the like.

In use, gas turbines 102a and 102b generate heat when combusting gas, or other combustible fuel sources. Preferably, combustion turbines of co-generation process 20 include heat recovery steam generators (HRSG) 104a and 104b, which preferably convert the energy in the exhaust heat from gas turbines 102a and 102b to steam energy to desalinization trains 30 and other ancillary systems. Such heat recovery steam generators (HRSG) 104a and 104b, preferably are coupled to the exhaust manifold of gas turbines 102a and 102b as a heat exchange unit.

Although FIG. 3 represents two heat recovery steam generators (HRSG) 104a and 104b, it is contemplated in a preferred embodiment that heat recovery steam generators (HRSG) 104 will match the number of gas turbines 102 and sized to meet the heat source 52 requirements of desalinization process 10. It is further contemplated in a preferred embodiment that dual purpose co-generation process 20 is optimized to simultaneously satisfy demand for fresh water and power.

As shown in FIG. 2 distilled water known as product water may be pumped from product water storage tank(s) 66 to demineralization system 92 wherein product water is demineralized by removing any dissolved solids such as calcium, magnesium, sodium, potassium and the like. This distilled water is pumped to make up water tank 106 for input into heat recovery steam generators (HRSG) 104a and 104b as needed.

Alternatively, co-generation process 20 has power generation process shown as gas turbines; however, such process may utilize steam expansion turbines for power generation wherein such steam is generated by a steam generating system. Steam generating systems for such steam expansion turbines may utilize nuclear reactor; coal, gas, or oil fired boilers; waste heat from stack exhaust or other heat sources. Excess steam from such steam generating system may be utilized as heat source 52 during low electric power demands, scheduled turbine outages, off peak hours of the power distribution grid or during peak potable water periods.

Whether co-generation process 20 captures exhaust heat from a gas turbine or exhaust stack, or from excess steam generating systems to heat saltwater to be distilled, such co-generation process 20 gains economies of scale with regard to fuel consumption than operating the desalination plant in a non co-generation process.

It is contemplated in a preferred and alternate embodiment that utilization of common systems between both desalination and power systems will result in lower capital cost for such facilities when combined.

It is contemplated in a preferred and alternate embodiment that scaling of the co-generation facility to meet fresh water demands and serve a dual purpose of simultaneously supplying power demands by increasing or decreasing the number of wells, turbines and desalination trains of this invention.

With respect to the above description then, it is to be realized that the optimum sizing of the gas turbines, heat recovery steam generators, brine supply, re-injections system, desalinization trains will be determined based on site specifications, power and potable water demand, and, thus, the parts of the invention, shall include variations in components, size, materials, shape, form, position, function and manner of operation, assembly and use, and will provide fresh potable water and electrical power requirements to local communities.

The invention disclosed and claimed relates to the various modifications of assemblies herein disclosed and their reasonable equivalents, and not to any particular method or apparatus for desalinating water combined with power generation. Although the invention has been described with respect to a co-generation process for desalinating seawater, many of the inventive aspects can be applied to other solutions requiring distillation.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation.

Accordingly, the present invention is not limited to the specific embodiments illustrated herein, but is limited only by the following claims.

What is claimed is:

1. A process for improving thermal and energy efficiency of a desalination process, comprising:
   at least one power generation turbine generating electricity for a power grid, wherein said at least one power generation turbine has a heat source;
   coupling at least one distillation stage, of at least one desalinating train of a brine handling area, to said heat source for distilling product water from seawater to make potable water wherein said at least one power generation turbine, said handling area and said at least one desalinating train are located inland and above-ground;
   at least one substrata seawater table supply well pumping substrata seawater from a first non-inland location and below a fresh water aquifer and substrata barrier for processing by said at least one desalinating train, said at least one substrata seawater table supply well positioned underground and having a proximal end and a distal end, wherein said proximal end is operatively connected to said brine handling area and said distal end is positioned at said first non-inland location and below a fresh water aquifer and substrata barrier;
   at least one substrata seawater table discharge well re-injecting a brine effluent from said at least one desalinating train into the substrata seawater table supply well, said at least one substrata seawater table discharge well positioned underground and having a proximal end and a distal end,
   operatively connecting said proximal end to said brine handling area;
   positioning said distal end at a second non-inland location and below said fresh water aquifer and substrata barrier;
   re-injecting the brine effluent into said second non-inland location and below said fresh water aquifer and substrata barrier,
   spacing said first non-inland location of said at least one substrata seawater table supply well a distance from said second non-inland location of said at least one substrata seawater table discharge well such that the substrata seawater pumped by said at least one substrata seawater table supply well for processing does not include the brine effluent re-injected by said at least one substrata seawater table discharge well, and
   establishing an exchange of the substrata sea water from said first non-inland location to said second non-inland location, and thereby avoiding depletion, and providing a continued availability of seawater resources from said substrata sea water to make subsequent potable water.

2. The process according to claim 1, wherein said at least one power generation turbine is a gas turbine.

3. The process according to claim 2, wherein said heat source is a heat recovery steam generator coupled to said gas turbine.

4. The process according to claim 1, wherein said at least one substrata seawater table supply well further comprises a supply well end tap, and said at least one substrata seawater table discharge well further comprises a discharge well end tap, and wherein said well end taps are a distance apart.

5. The process according to claim 1, wherein said at least one substrata seawater table supply well further comprises a supply well head, and said at least one substrata seawater table discharge well further comprises a discharge well head, and wherein said well heads are co-located in said brine handling area.

6. The process according to claim 1, wherein said brine handling area is a distance from a coastal area shoreline.

7. The process according to claim 1, wherein said brine supply well further comprises a supply well head and wherein said well head is a distance from a coastal area shoreline.

* * * * *